United States Patent [19]

Li et al.

[11] Patent Number: 5,521,988

[45] Date of Patent: May 28, 1996

[54] VECTOR TRANSFORM CODER WITH MULTI-LAYERED CODEBOOKS AND DYNAMIC BIT ALLOCATION

[75] Inventors: Weiping Li, Bethlehem, Pa.; Ya-Qin Zhang, Acton, Mass.

[73] Assignee: GTE Laboratories Incorporated, Waltham, Mass.

[21] Appl. No.: 223,206

[22] Filed: Apr. 5, 1994

[51] Int. Cl.[6] .................................................. G06K 9/36
[52] U.S. Cl. ................................. 382/248; 382/253
[58] Field of Search ............................. 382/56, 22, 232, 382/253, 248, 197; 348/408, 414, 417–418, 422

[56] References Cited

U.S. PATENT DOCUMENTS

| | | | |
|---|---|---|---|
| 4,922,508 | 5/1990 | Moriya | 348/422 |
| 5,086,439 | 2/1992 | Asui et al. | 348/422 |
| 5,150,209 | 9/1992 | Baker et al. | 348/407 |
| 5,235,418 | 8/1993 | Lucas | 348/422 |

*Primary Examiner*—Joseph Mancuso
*Attorney, Agent, or Firm*—J. Stephan Yeo; Victor F. Lohmann, III

[57] ABSTRACT

In a vector transform coding (VTC) scheme for image and video compression, a multi-layered codebook structure and a dynamic bit-allocation scheme in the vector transform domain are employed. The main advantage of this technique is that distortion is controlled by dynamically allocating more bits to vectors causing larger distortions and less bits to vectors causing smaller distortions.

1 Claim, 8 Drawing Sheets

VECTOR TRANSFORM CODER WITH MULTI-LAYERED CODEBOOKS AND DYNAMIC BIT ALLOCATION

CROSS-REFERENCE TO RELATED APPLICATIONS

This application is related to copending application Ser. No. 08/223,293, assign to the same assignee as this, and entitled, "METHOD AND APPARATUS OF USING VECTOR SUBBAND CODER (VSC) FOR IMAGE COMPRESSION" of Weiping Li, John P. Wus, III, and Ya-Qin Zhang filed concurrently herewith. The copending application is hereby incorporated by reference into this application.

FIELD OF THE INVENTION

The present invention relates to signal coding and, more particularly, to vector transform coding for image and video compression.

BACKGROUND OF THE INVENTION

The pixels of a natural digital image are highly correlated, namely that there exists a redundancy between image pixels. The objective of image coding is to remove the redundancy so that, with little distortion, much fewer bits can be used to represent an image than simply quantizing individual pixels, such as through PCM. One way to remove redundancy is predictive coding, in which the residual signal between the current pixel and its predicted value is coded. Because the difference value represented by the residual signal contains less redundancy than the pixel itself, coding the difference value is more efficient than coding the pixel itself. The research on predictive coding is summarized by Gersho and Gray in Vector Quantization and Signal Compression, Kluwer Academic Publishers, 1992, herein incorporated by reference.

Transform coding is another way to achieve the objective of redundancy removal. In transform coding, an orthogonal transform is applied to a block of image pixels so that the transform domain coefficients become less correlated than the image domain pixels. The performance of a transform is measured by its decorrelation property and associated energy compaction capability.

Vector quantization (VQ) is a more direct way to take advantage of the pixel correlation characteristics for image coding. Theoretically, VQ is the best quantization technique and its optimality is achieved when the number of vector dimensions approaches infinity. A detailed discussion on the complexity and storage limitations of VQ can be found in Gersho and Gray, supra. Due to the rapid increase in complexity with the number of vector dimensions, in practice, an image is always divided into small blocks and VQ is applied to each block. Then the issue is how to remove redundancy between the blocks. Predictive VQ and finite state VQ have been studied to achieve such inter-vector redundancy removal.

Recently, vector transformation (VT) has been proposed for image coding to remove inter-vector correlation [See W. Li, "Vector Transform Coding, IEEE Trans. Circuits and Systems for Video Technology, Vol. 1, No. 4, 12/91, herein incorporated by reference]. Vector transform coding (VTC) is a vector generalization of the conventional transform coding techniques, which will be referred to as scalar transform coding (STC) in this context. In such a vector generalization, a pixel is replaced by a block of pixels (a vector), the ST which decorrelates scalar pixels is replaced by a VT which decorrelates vectors, and scalar quantization (SQ) in the ST domain is replaced by VQ in the VT domain. It was found in W. Li and Y.-Q. Zhang, "New Insights and Results on Transform Domain VQ of Images," IEEE ICASSP'93, April 1993, and W. Li and Y.-Q. Zhang, "A Study on the Optimal Attributes of Transform Domain Vector Quantization for Image and Video Compression," IEEE ICC'93, May 1993 (herein incorporated by reference) that VR also preserves the intra-vector correlation while decorrelates the inter-vectors, which allows significant performance gain over ST when VQ is used.

SUMMARY OF THE INVENTION

A method of generating a codebook for image coding, comprises the steps of transforming a plurality of training images into respective vector in the vector transform domain; calculating a first centroid value for each vector component; calculating a second centroid value for each vector component employing a subtraction operation with a mean value of said training images; deriving a first codebook group having a plurality of codebook elements by executing a training algorithm using said vector components and the first centroid values; and deriving a second codebook group having a plurality of codebook elements by executing a training algorithm using said vector components and the second centroid values.

DETAILED DESCRIPTION OF THE PREFERRED EMBODIMENTS

In a vector quantization system, an important issue is the codebook design. The codebook is the basis for both encoding and decoding. A good codebook should be robust to picture content variations and produce small distortions for all input vectors. A novel method for codebook construction is described herein using a multi-layered codebook structure. An associated problem with vector codebook-based coding system is bit allocation among vectors. An optimal bit allocation scheme should produce minimum distortion for a given codebook size. A problem associated with the conventional bit-allocation approach is that bit-allocation in the transform domain is based on the statistical properties of the transform domain coefficients or vectors (variances or determinants of covariance matrices). This may result in a large distortion when a particular transform domain coefficient or vector is very different from the statistical behavior of majority coefficients or vectors. A new method is also described herein for dynamic bit allocation that ensures a better distortion control.

Figure 1:
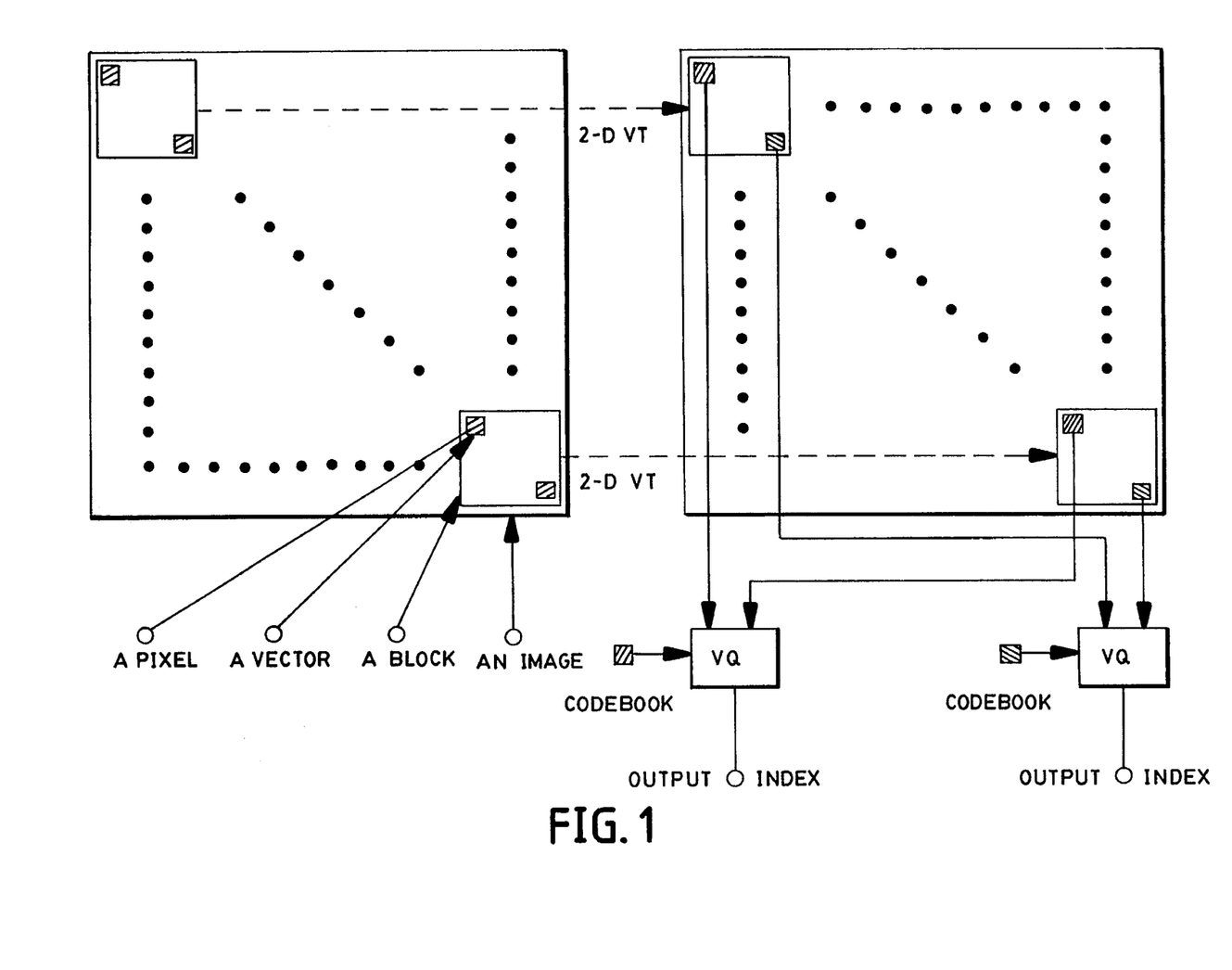
FIG. 1 shows a vector-based transform and quantization system.

FIG. 1 shows a typical vector-based transform and quantization system. The first step of vector transformation maps the original image vectors into a set of vectors in the VT domain where vectors are decorrelated while the correlation among different components within a vector is preserved. The second step of VQ maps the VT domain vectors into bit streams. Detailed descriptions of vector transformation and its attributes for image coding have been described in Li, Li and Zhang (ICASSP'93), and Li and Zhang (ICC '93), supra. This invention describes a new method and apparatus for VQ in the VT domain. This new method is based on a multi-layered codebook structure and a dynamic bit-allocation scheme.

Multi-Layer Codebook Structure

Figure 2:
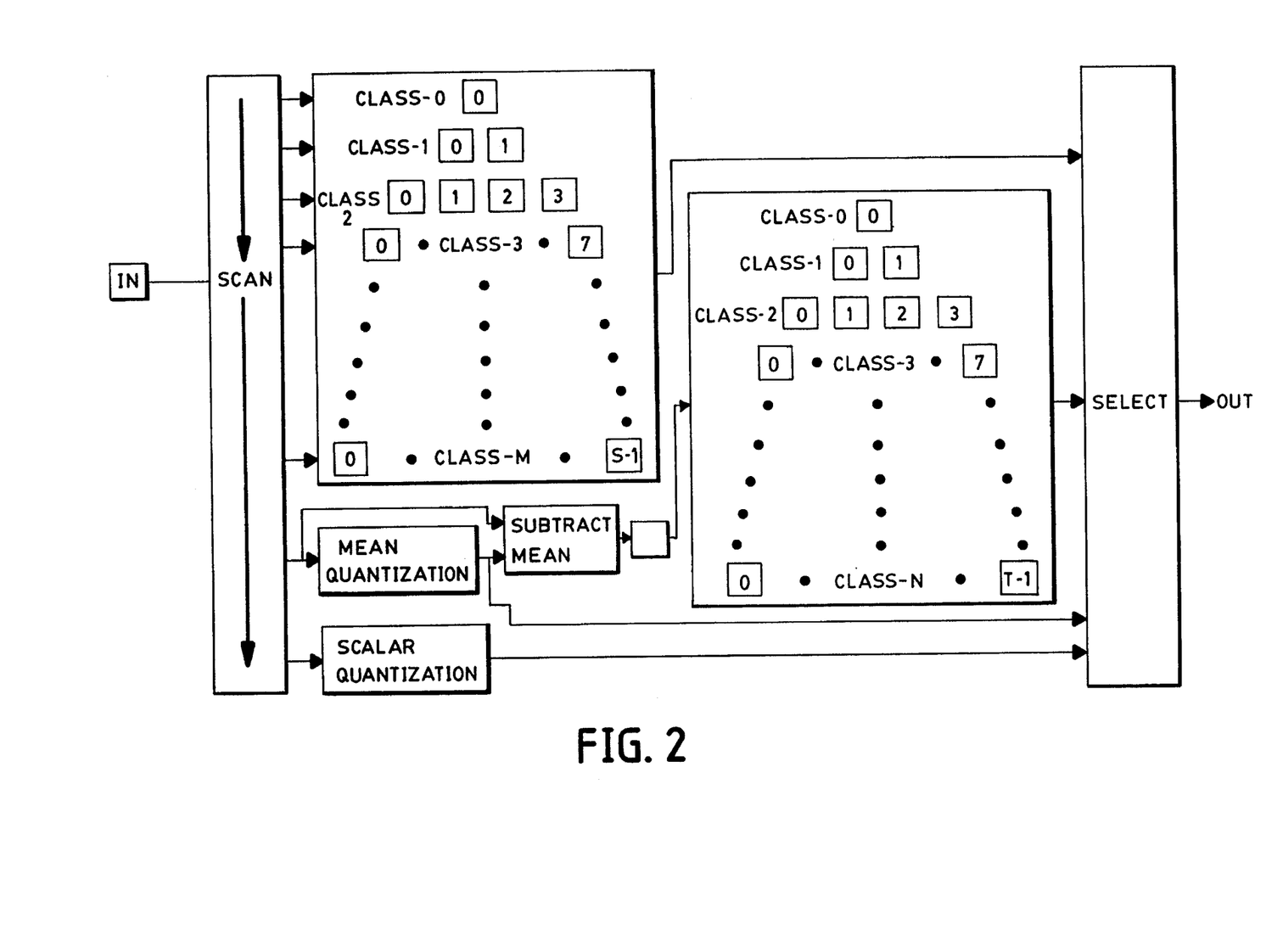
FIG. 2 illustrates a multi-layered codebook structure in accordance with the present invention.

The new multi-layered codebook structure is illustrated in FIG. 2. The codebook set consists of a multiplicity of codebooks in three stages. The following list provides the parameters used in describing the codebook structure:

1. M:
   the maximum number of bits in Stage-1 codebook;
2. S:
   $S=2^M$ is the number of codewords in Class-M in Stage-1;
3. N:
   the maximum number of bits in Stage-2 codebook;
4. T:
   $T=2^N$ is the number of codewords in Class-N in Stage-2;
5. NC:
   NC=M+3 is the total number of classes in Stage-1;
6. $NC_{MR}$:
   $NC_{MR\ N}+1$ is the total number of classes in Stage-2;
7. MD-0:
   maximum distortion for Class-0 in Stage-1;
8. MD-A:
   maximum distortion for Classes 1 to M−1 in Stage-1;
9. MD-T:
   maximum distortion for Class-M in Stage-1;
10. $MD_{MR}$-0:
    maximum distortion for Class-0 in Stage-2;
11. $MD_{MR}$-A:
    maximum distortion for Classes 1 to N−1 in Stage-2;
12. $MD_{MR}$-T:
    maximum distortion for Class-N in Stage-2;
13. $SS_M$:
    step Size for mean quantization in Stage-2;
14. $SS_S$:
    step size for scalar quantization in Stage-3;
15. CI:
    class increment ($1 \leq CI \leq M$) in Stage-1; and
16. $CI_{MR}$:
    class increment ($1 \leq CI_{MR} \leq N$) in Stage-2.

In Stage-1, the codebook can be described as a tree structure where each individual codebook is obtained by training a set of image sequence using the LBG algorithm. Class-i for $0 \leq i \leq M$ represents an i-bit codebook, which is generated from the intermediate results in the i-th iteration of the LBG algorithm. Therefore, Class-0 is the centroid of the training sequence at the corresponding VT locations. Class-M represents the final converged codebook resulted from the codebook training process in the LBG algorithm. There are total of M+3 classes in Stage-1, with Class-0 to Class-M being the Stage-1 codebook set, Class(M+1) being the index to Stage-2, and Class-(M+2) being the index to Stage-3.

In Stage-2, the codebook set is obtained in a similar way to the method in Stage-1, with the exception that the mean for each training vector has been subtracted. Therefore, Class-i for $0 \leq i \leq N$ represents an i-bit codebook, which is generated from the intermediate results in the i-th iteration of the LBG algorithm applied to the mean-removed training vectors. The mean is also scalar quantized with a step size of $SS_M$ and transmitted in the compressed bit stream. There are N+1 classes in Stage-2. Stage-3 is a scalar quantization process in which each component of an incoming vector is scalar quantized and transmitted.

Such a multi-layered codebook structure is capable of accommodating large variations of incoming image contents by using a multiplicity of codebooks. It allows significant bit saving by selecting the most appropriate classes and codebook sizes. In addition, it avoids the disadvantage of the conventional single codebook approach in terms of maximum distortion control. In other words, the proposed codebook structure guarantees that the maximum distortion is always below a certain level by the combination of the scalar quantizer and vector quantizer. The procedure for generating the multi-layered codebooks is outlined as follows:

1. A set of training images are transformed into vectors in the VT domain;
2. The centroids $\{C_P\}$ are calculated for all VT positions $0 \leq p \leq P-1$;
3. The centroids $\{CMR_P\}$ are calculated for all VT positions $0 \leq p \leq P-1$ with mean removed;
4. The codebook set in Stage-1 is obtained using the LBG algorithm; and
5. The mean-removed codebook set in Stage-2 is obtained using the LBG algorithm.

Dynamic Bit Allocation for Distortion Control

Vectors with different indices in the VT domain have very different characteristics. Given a number of total bits, the question is how to construct the codebooks and allocate bits to the vectors so that distortion is minimized.

Bit allocation among different vectors is an important issue for vector-based coder. For a given number of bits, an optimum bit allocation method produces minimum distortion. A problem associated with the conventional fixed bit-allocation approach for either STC or VTC is that bit-allocation in the transform domain is based on the statistical properties of the transform domain coefficients or vectors (variances or determinants of covariance matrices). This may result in a large distortion when a particular transform domain coefficient or vector is very different from the statistical behavior of majority coefficients or vectors. This is why edges in an image are not coded very well in any fixed bit-allocation based schemes in which high frequency coefficients or vectors are usually given very few or no bits.

This section describes a dynamic bit allocation method for distortion control. A key difference of this approach from the fixed bit-allocation method is that a vector is always coded according to its own importance level, in comparison to the statistical behavior of majority vectors that are used to derive the bit allocation formula. In most cases, the codec operates at Stage-1, which is the most efficient stage in terms of the number of bits to be coded. If the Stage-1 codebook set fails to meet the distortion requirement, the codec then moves to the Stage-2 codebook set. The least efficient scalar quantizer is then used if the Stage-2 codebook sets still cannot satisfy the distortion requirement. In both Stages 1 and 2, the codec will stop at the class that uses the least number of bits while still meeting the distortion requirement. The procedures for dynamic bit allocation and coding are described as follows:

1. Encoding:
   (a) An incoming image block is mapped into vectors $\{VVT_P, 0 \leq p \leq P\}$ in the VT domain according to the methods described in Li, Li and Zhang (ICASSP'93), and Li and Zhang (ICC'93), supra;
   (b) Set initial maximum distortion values $\{MD\text{-}0, MD\text{-}A, MD\text{-}T, MD_{MR}\text{-}0, MD_{MR}\text{-}A, MD_{MR}\text{-}T\}$ and the step sizes $\{SS_M, SS_S\}$
   (c) The distortion $D_P$ between the incoming vector $VVT_P$ and the centriod $C_P$ is calculated. If $D_P \leq MD\text{-}0$, set the Stage-1 classification bit ID-$1_P$=0.
   (d) Otherwise, the distortion $D_P$ between the incoming vector $VVT_P$ and the Stage-1 codebook CB-$i_P$, $1 \leq i \leq M-1$ and i=i+CI is calculated. If $D_P \leq MD\text{-}A$, set the Stage-1 classification bit ID-$1_P$=i followed by the corresponding index;
   (e) Otherwise, the distortion $D_P$ between the incoming vector $VVT_P$ and the Stage-1 codebook CB-$M_P$ is calculated. If $D_P \leq MD\text{-}T$, set the Stage-1 classification bit ID-$1_P$=M followed by the corresponding index;
   (f) Otherwise, the mean of the incoming vector $VVT_P$ is scalar quantized with step size $SS_M$, and the mean-removed vector VVT-$MR_P$ is formed by subtracting the quantized mean. Set the Stage-1 classification bit ID-$1_P$=M+1 followed by the quantized mean;
   (g) The distortion $D_P$ between the incoming vector VVT-$MR_P$ and the centriod $CMR_P$ is calculated. If $D_P \leq MD_{MR}\text{-}0$ set the Stage-2 classification bit ID-$2_P$=0;
   (h) Otherwise, the distortion $D_P$ between the incoming vector VVT-$MR_P$ and the Stage-2 codebook CBMR-$i_P$, $1 \leq i \leq N-1$ and i=i+CIMR is calculated. If $D \leq MD_{MR}\text{-}A$ set the Stage-2 classification bit ID-$2_P$=i followed by the corresponding index.
   (i) Otherwise, the distortion $D_P$ between the incoming vectors VVT-$MR_P$ and the Stage-2 codebook CBMR-$N_P$ is calculated. If $D_P \leq MDMR\text{-}T$, set the Stage-2 classification bit ID-$2_P$=N followed by the corresponding index;
   (j) Otherwise, scalar quantizing $VVT_P$ with set size $SS_S$. Set the Stage-1 classification bit ID-$1_P$=M+2 followed by the scalar-quantized vector.
   (k) If the number of bits used to code $\{VVT_P, 0 \leq p \leq P-1\}$ equals the total number of bits per block, go to (a) for another image block.
   (l) Otherwise, adjust the set of maximum distortions $\{MD\text{-}0, MD\text{-}A, MD\text{-}T, MD_{MR}\text{-}0, MD_{MR}\text{-}A, MD_{MR}\text{-}T\}$ and the step sizes $\{SS_M, SS_S\}$ and go to (c).

2. Decoding:
   (a) If ID-$1_P$=0, the centroid $C_P$ in Stage-1 codebook set is used as the corresponding vector.
   (b) If ID-$1_P$=i, go to Class-i in Stage-1 codebook set and find the corresponding codeword using the index following ID-$1_P$;
   (c) If ID-$1_P$=M+1 and ID-$2_P$=0 the centroid $CMR_P$ in Stage-2 codebook set is used as the corresponding vector with quantized mean added.
   (d) If ID-$1_P$=M+1 and ID-$2_P$=i for $1 \leq i \leq N$, go to Class-i in Stage-2 codebook set and find the corresponding codeword using the index following ID-$2_P$.

Figure 3:
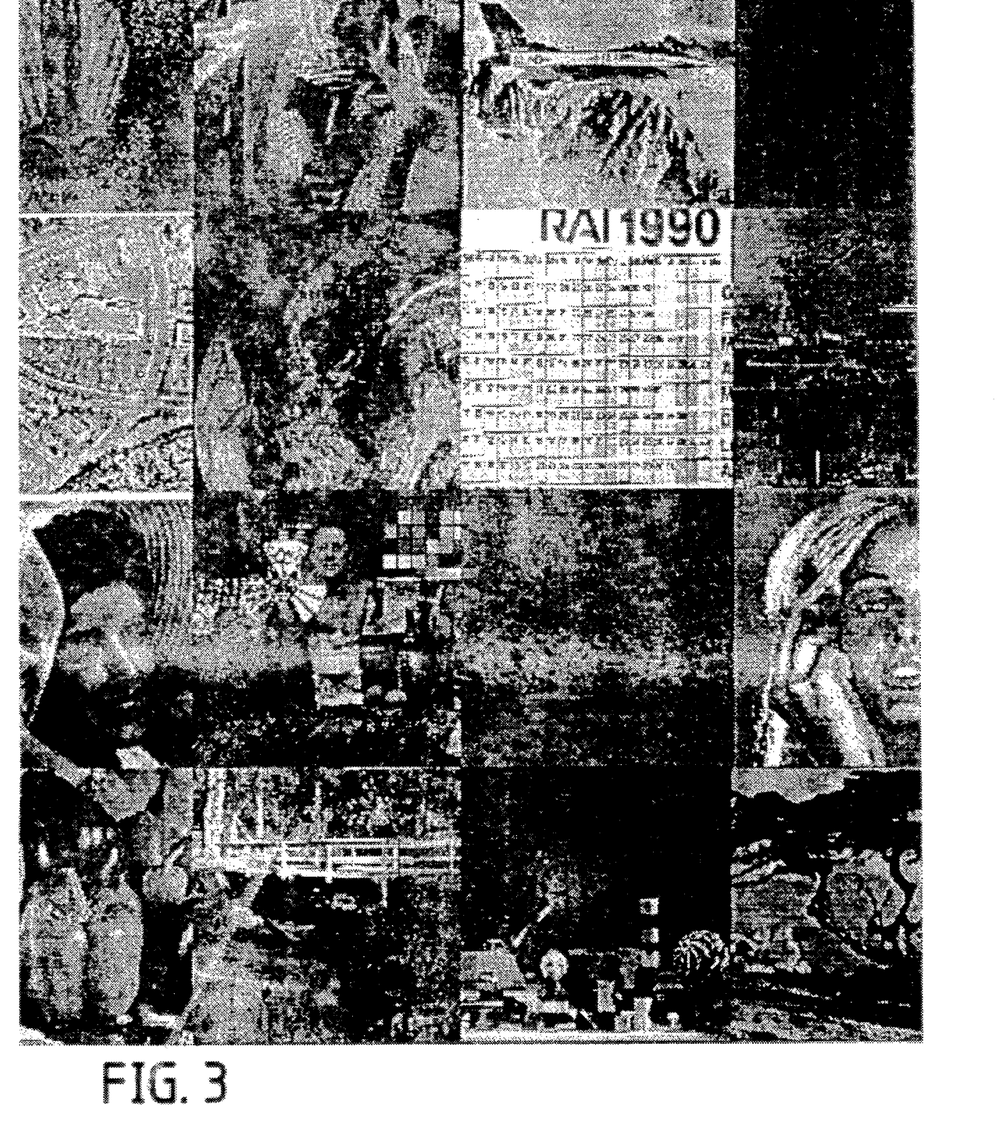
FIG. 3 shows a series of training images for generating codebooks.
Figure 4:
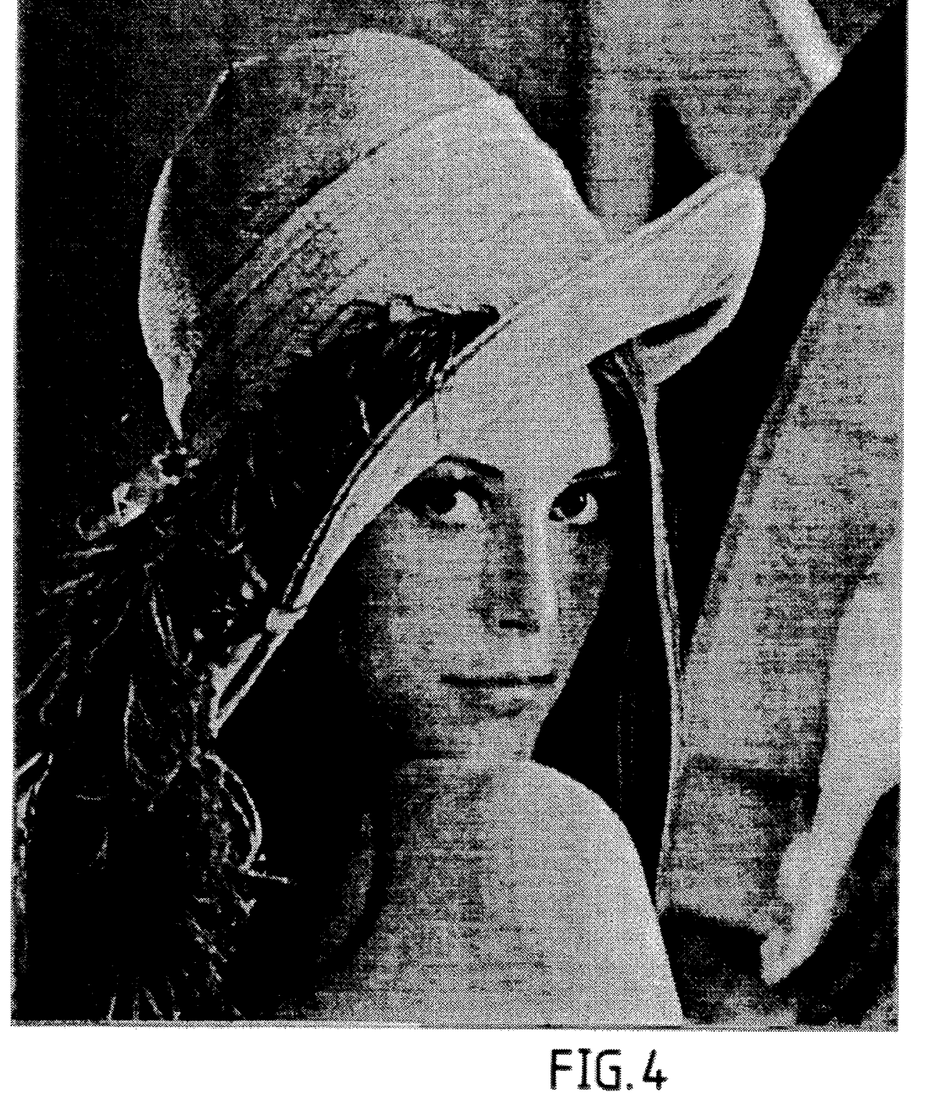
FIG. 4 is an image for testing the vector transform coding (VTC) scheme of the present invention.
Figure 5:
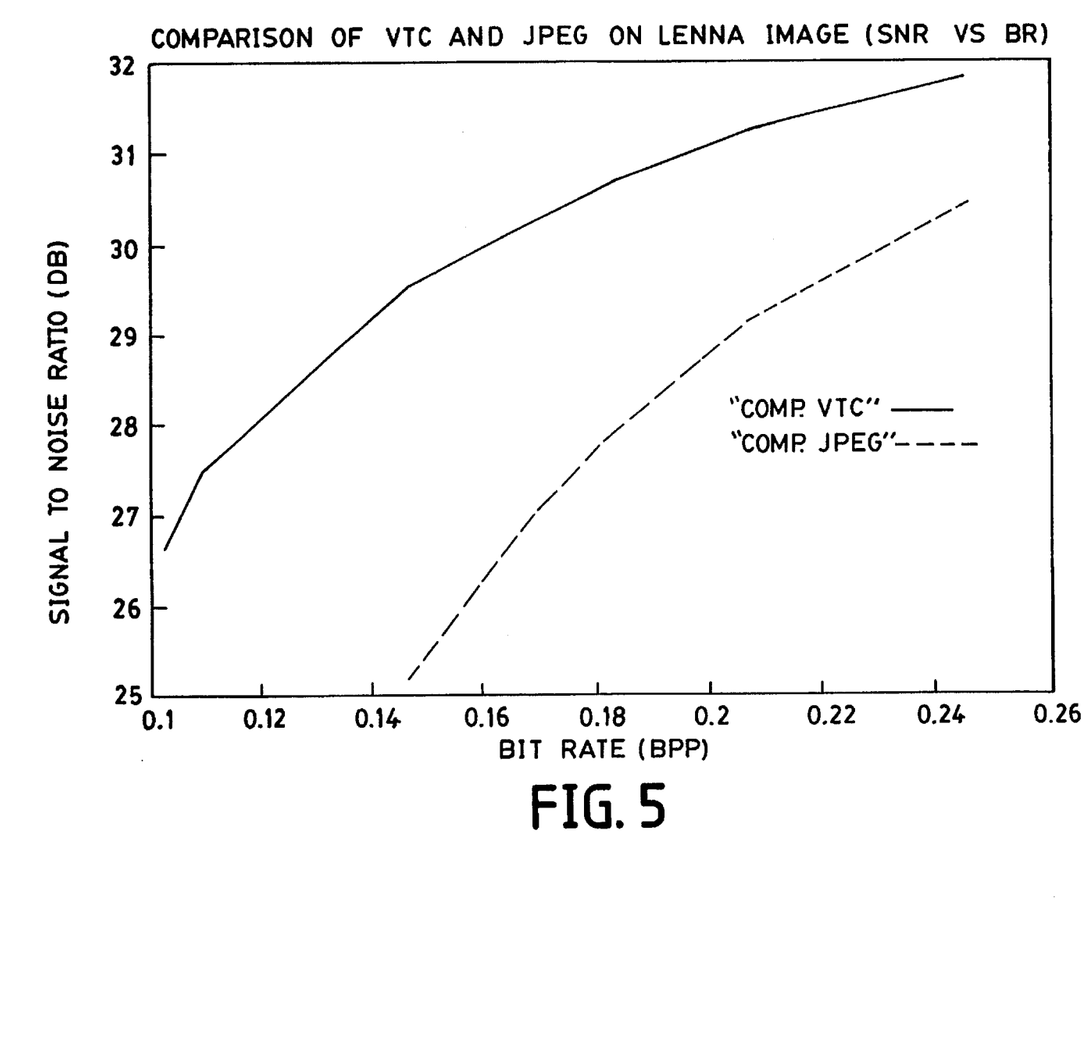
FIG. 5 is a graphical comparison of the SNR vs. bit-rate performances of the VTC scheme and JPEG scheme.
Figure 6:
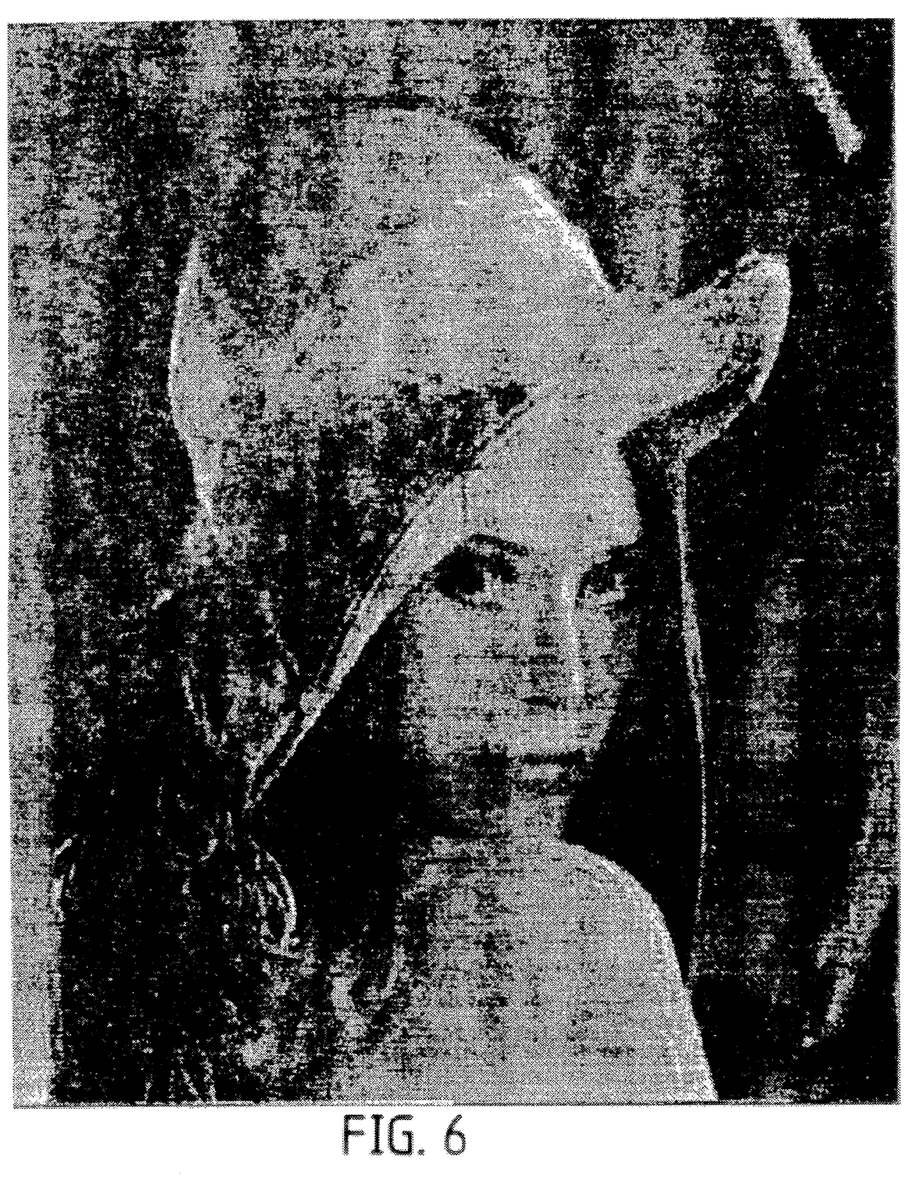
FIG. 6 is an image produced using the VTC scheme of the present invention.
Figure 7:
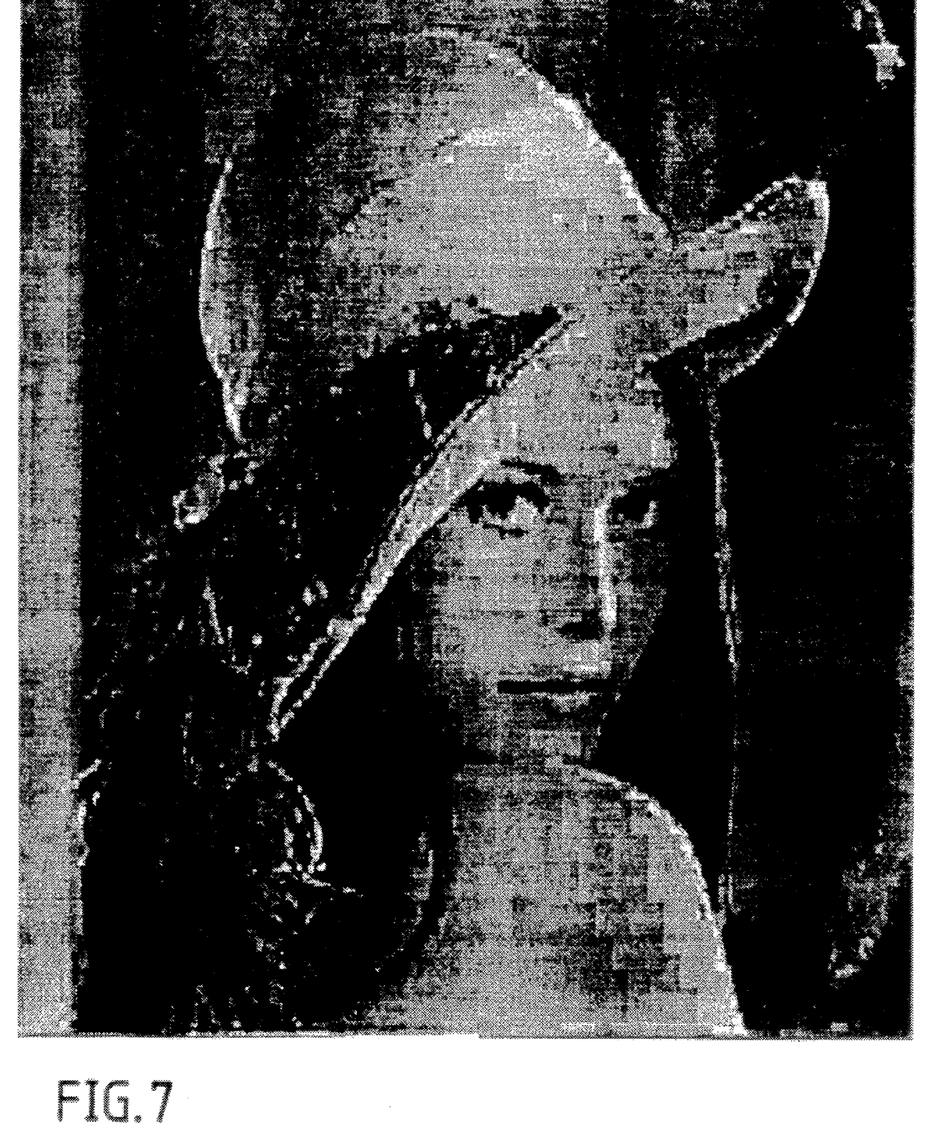
FIG. 7 is an image produced using the JPEG standard.
Figure 8:
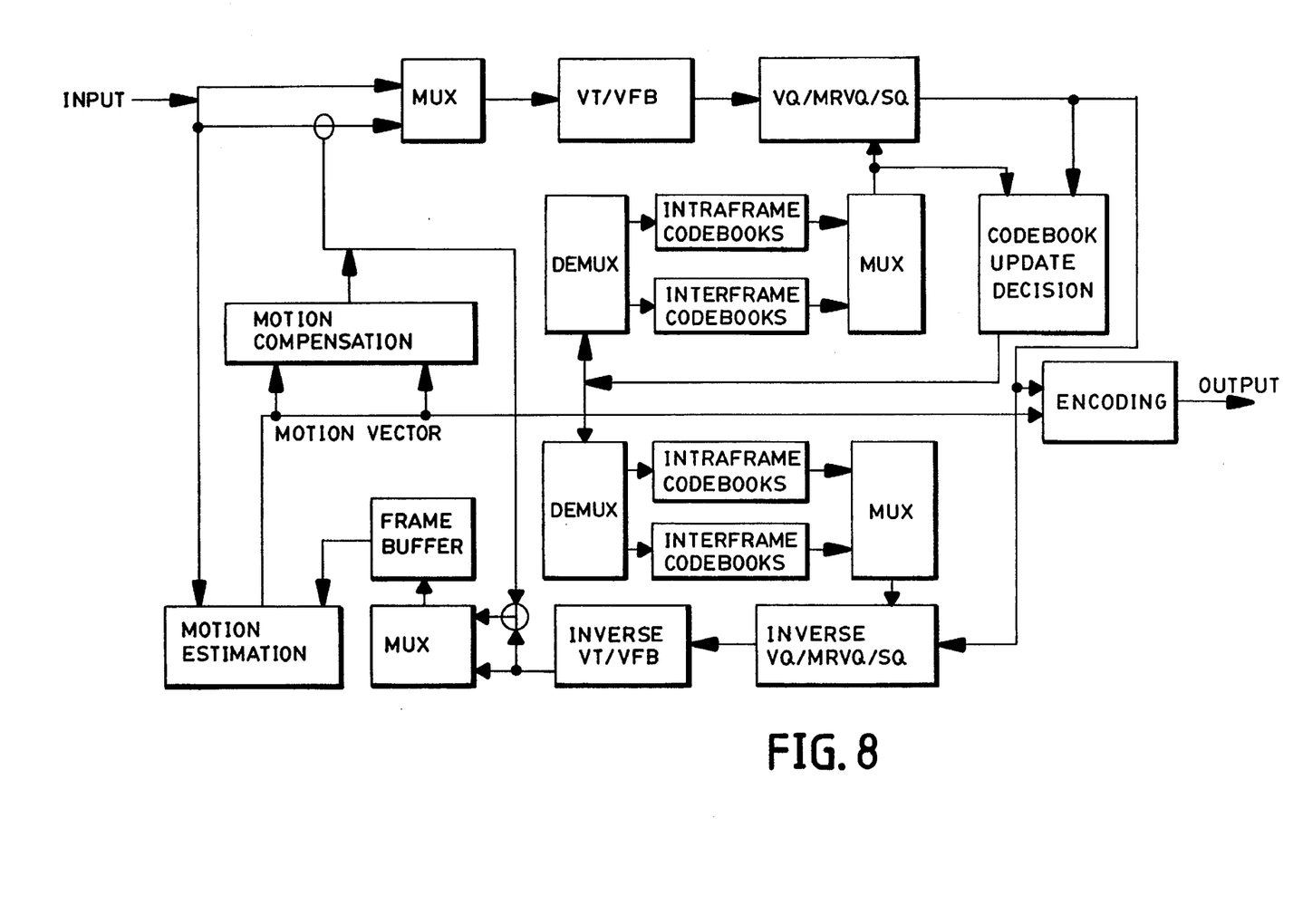
FIG. 8 is a block diagram of a VSC scheme for very low bit rate video comparison.

The vector is reconstructed by adding back the dequantized mean value to the codeword;
   (e) If ID-$1_P$=M+2, scalar dequantization is used to reconstruct the vector;
   (f) The reconstructed vectors in the VT domain are inverse-mapped back to the image domain according the methods described in Li, Li and Zhang (ICASSP'93) and Li and Zhang (ICC'93), supra. In an operational implementation of the present invention, codebooks in the VT domain are obtained using the LBG algorithm based on a set of 16 training images shown in FIG. 3. A 4×4 vector size and 8×8 VT size is used. Each training image has 512×512 pixels and thus contributes 256 training vectors for every VT position. The set of 16 training images provide a total of 4096 training vectors for every VT position. The "Lenna" image in FIG. 4 is used as the test image from a set of training images. FIG. 5 shows the SNR vs bit-rate curve of the new VTC scheme and that of JPEG as a reference. FIG. 6 shows the subjective quality of the coded image using the new VTC scheme at a bit-rate of 0.17 bpp (SNR=30.3 db). As a reference, FIG. 7 shows a coded image using JPEG at the same bit-rate. It is clear from the simulation result that the new VTC scheme is much better than JPEG, especially at low bit rates. FIG. 8 shows an inter-frame FC-VSC block diagram loop for inter-frame coding of full-motion video sequences. The coding procedures are specified as follows:

I: Codebook Generation:
(a) Selecting a set of training video sequences which consist of pair-wise video frames;
(b) Intra-frame codebooks $\{\text{Intra\_CB}_P; 1 \leq p \leq P\}$ and centroids $\{\text{Intra\_C}_P; 1 \leq p \leq P\}$ are generated;
(c) Taking pair-wise difference of the training sequence and forming a set of differential video frames;
(d) Inter-frame codebooks $\{\text{Inter\_CB}_P; 1 \leq p \leq P\}$ and centroids $\{\text{Inter\_C}_P; 1 \leq p \leq P\}$ are generated.

II: Vector Encoding Loop:
(e) The first video frame is $\{F_O\}$ intra-frame coded by VSC using the intra-frame codebook set $\{\text{Intra\_CB}_P; 1 \leq p \leq P\}$ and intra-frame centroids $\{\text{Intra\_C}_P; 1 \leq p \leq P\}$ obtained in step (b), it is then decoded and stored in the frame buffer,
(f) Motion estimation and compensation are performed between an incoming video frame $\{F_i\}$ and the previous reconstructed frame $\{F_{i-1}\}$ in the frame buffer, to form a motion-compensated residual video frame $RF_i(m,n) = F_i(m,n) - F_{i-1}^{D}(m\text{-}mv_{x\text{-}mn}, n\text{-}mv_{y\text{-}mn})$;
(g) The motion-compensated residual frame $\{RF_n\}$ is encoded by the VSC scheme using the inter-frame codebook set $\{\text{Inter\_CB}_P; 1 \leq p \leq P\}$ and inter-frame centroids $\{\text{Inter\_C}_P; 1 \leq p \leq P\}$ obtained in step (d);
(h) The residual frame $\{RF_i\}$ is first reconstructed, then $F_1^D(m,n) = F_0^D(m + mv_{x\text{-}mn}, j + mv_{y\text{-}mn}) + RF_1^D(m,n)$ is reconstructed and stored in the frame buffer for reference in the next frame;
(i) All the vector index, motion vectors, and classification bits are entry-encoded prior to the transmission.
(j) Go to (e) if refreshing in the next frame, otherwise go to (f).

III: Vector Decoding Loop:
(k) All the vector index, motion vectors, and classification bits are entropy decoded;

(l) The first frame $\{F_0^D\}$ is reconstructed using {Intra_$CB_P$;123 $p \leq P$} and centroids {Intra_$C_P$;1$\leq$p$\leq$P} and stored in the frame buffer;

(m) The next incoming residual frame $\{RF_1^D\}$ is reconstructed using {Inter_$CB_P$;1$\leq$p$\leq$P} and centroids {Inter_$C_P$;1$\leq$p$\geq$P};

(n) Motion compensation is performed to reconstruct $\{F_1^D\}$, i.e. $F_1^D(m,n) = F_0^{D(m+mv\_x\_mn,\ j+mv\_y\_mn)} + RF_1^D(m,n)$, which is also stored in the frame buffer for reference in the next frame;

(o) This process is repeated until all frames $\{F_0^D, F_1^D, \ldots\}$ are reconstructed.

What has been shown and described herein is a vector transform coding (VTC) scheme for image and video coding. In a VTC system, there are two major parts. The first part is a vector transform (VT) which reduces correlation between vectors and preserves correlation among the components of individual vectors. The second part is vector quantization (VQ) in the VT domain. The new approach to vector quantization discussed herein is based on a multi-layered codebook structure and a dynamic bit-allocation scheme. The first layer of the codebook structure contains a tree of codebooks without subtracting the mean of vectors. The second layer of the codebook structure contains a tree of codebooks with mean of vectors removed and scalar quantized. The third layer of the codebook structure is scalar quantization of vector components.

The dynamic bit-allocation scheme starts with an initial set of maximum distortions and scalar quantization step sizes, allocation of sufficient bits to the vectors to satisfy the maximum distortion requirements, and adjustment of the set of parameters on the maximum distortions and step sizes until the total number of bits per block is used up. The advantage of the new method over conventional single codebook and fixed bit-allocation methods is that each individual vector is coded with sufficient bits to ensure a small distortion no matter how different this vector is from the statistical majority. Simulation results have shown that this new method for VQ in the VT domain performs much better than the standard methods.

While there has been shown and described herein what are presently considered the preferred embodiments of the invention, it will be obvious to those skilled in the art that various changes and modifications can be made therein without departing from the scope of the invention as defined by the appended claims.

What is claimed is:

1. A method of producing a multi-layered codebook structure for image coding, comprising the steps of:

transforming a plurality of training images into respective vector components in the vector transform domain;

calculating a first centroid value for each vector component;

calculating a second centroid value for each vector component by subtracting a mean value of said vector component therefrom;

deriving a first codebook layer having a plurality of codebook elements by executing a training algorithm using said vector components and the first centroid values;

deriving a second codebook layer having a plurality of codebook elements by executing a training algorithm using said vector components and the second centroid values; and deriving a third codebook layer having a plurality of codebook elements by scaler quantization of said vector components.

* * * * *